Patented Oct. 5, 1954

2,691,014

UNITED STATES PATENT OFFICE 2,691,014

OXIDOSTEROIDS

Robert Bruce Moffett, Kalamazoo, Mich., assignor to The Upjohn Company, Kalamazoo, Mich., a corporation of Michigan No Drawing. Application March 21, 1952, Serial No. 277,913

18 Claims. (Cl. 260—239.55)

This invention relates to novel oxidosteroids and is more particularly concerned with the novel oxides of normal and allo 3-acyloxy-17-(1-acyloxyethylene)-16-etiocholenes, the 3-acyloxy - 16(17) - oxido - 17 - (1 - acyloxyethylene-etiocholanes and 3-acyloxy-16(17)-oxido-17-(1-acyloxyethyleneoxide) - etiocholanes, and to a novel process for the production thereof.

The novel compounds of the present invention are the normal and allo 3-acyloxy-16(17)-oxido-17-(1-acyloxyethylene)-etiocholanes which may be represented by structural Formula I, and the normal and allo 3-acyloxy-16(17)-oxido-17-(1-acyloxyethyleneoxide)-etiocholanes which may be represented by structural Formula II, wherein the acyloxy groups have the formula AcO, Ac being the acyl radical of an organic carboxylic acid, and wherein the configuration of the 3-acyloxy group includes both alpha and beta forms. The terms etiocholane and etiocholene, as used in this specification and claims, unless otherwise specified, include both normal and allo forms.

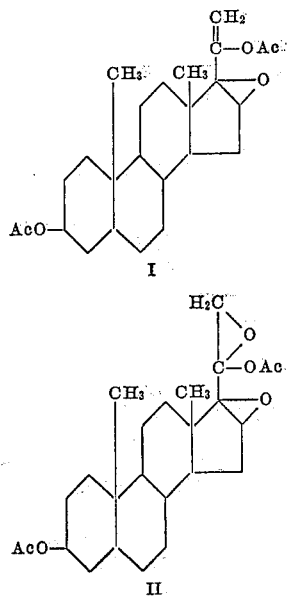

It is an object of the present invention to provide novel allo and normal 3-acyloxy-16(17)-oxido - 17 - (1 - acyloxyethylene) - etiocholanes and 3 - acyloxy - 16(17) - oxido - 17 - (1 - acyloxyethyleneoxide) - etiocholanes. It is another object to provide a novel process for the production thereof. Other objects of the invention will be apparent to those skilled in the art to which this invention pertains.

The compounds of the present invention have utility in the production of both known and new steroids having an oxygen atom at carbon atom 17, said compounds being members of a class of compounds possessing known physiological activity. For example, reduction of the compounds of the present invention with lithium aluminum hydride and thereafter oxidizing the reduction product with chromic acid according to known procedures will produce the known normal etiocholane-3,17-dione and the known etioallocholane-3,17-dione (androstane-3,17-dione) depending upon the configuration of the 5-hydrogen of the starting compound. Moreover, 3β-acetoxy-16(17) - oxido - 17 - (1 - acetoxyethylene) - etioallocholane is converted by hydrolysis and subsequent reacetylation of the 3-hydroxy group to the known 3β-acetoxy-16(17)-oxido-allopregnane-20-one [Plattner, Ruzicka et al., Helv. Chim. Acta, 30, 385 (1947)].

The novel oxides of 3-acyloxy-17-(1-acyloxyethylene)-16-etiocholenes of the present invention are prepared by reacting a normal or allo-3 - acyloxy - 17 - (1 - acyloxyethylene) - 16-etiocholene (3,20 - diacyloxy - 16,20 - pregnadiene) with a peracid such as, for example, perbenzoic acid or peracetic acid, at about room temperature or below room temperature, in a solvent such as, for example, benzene, toluene, chloroform, acetic acid, or mixtures thereof. When following the method of the present invention, yields of about 75 percent or more of product are consistently obtained, with the time required for completion of the reaction being somewhat dependent upon the temperature at which the reaction is carried out and the amount of peracid used. The highest yields of 3-acyloxy-16(17)-oxido - 17 - (1 - acyloxyethylene) - etiocholanes are obtained when the temperature of the reaction is carried out at temperatures substantially below room temperature using about one molar equivalent of peracid, while it is advantageous to employ temperatures at about room temperature and an excess of about two molar equivalents of peracid when high yields of 3-acyloxy-16(17)-oxido - 17 - (1 - acyloxyethyleneoxide) - etiocholanes are desired.

The starting compounds of the present invention are prepared by reacting a normal or allo 3α- or 3β-hydroxy or acyloxy-16-pregnene-20-one with isopropenyl acetate or other isopropenyl acylate in the presence of an acid catalyst such as, for example, para-toluenesulfonic acid, sulfoacetic acid, sulfosalicylic acid, and others. Conveniently, after removal of the excess isopropenyl acylate, this reaction mixture may be treated directly with a peracid to produce the products of the present invention.

The following examples are illustrative of the process and products of the present invention but are not to be construed as limiting.

PREPARATION 1.—3β-ACETOXY-17-(1-ACETOXYETHYLENE)-16-ETIOALLOCHOLENE (3β,20-DIACETOXY-16,20-ALLOPREGNADIENE)

Two grams of 3β-acetoxy-16-allopregnene-20-one [Marker et al., J. Am. Chem. Soc., 64, 468 (1942)], twenty milliliters of isopropenyl acetate and 0.1 gram of para-toluenesulfonic acid were placed in a reaction flask to which was attached a short fractionating column. The mixture was heated to boiling and a mixture of acetone and isopropenyl acetate distilling between 56 and ninety degrees centigrade was collected over a period of from about eight to ten hours. The para-toluenesulfonic acid was then neutralized by addition of solid sodium bicarbonate and the excess isopropenyl acetate was thereafter removed under reduced pressure. Cold water and methylene chloride were added with stirring to the residue. The methylene chloride layer was separated, washed with water, dried over anhydrous sodium sulfate and the solvent then removed by distillation. The residue, on crystallization from acetone, gave 1.4 grams of 3β-acetoxy - 17 - (1 - acetoxyethylene) - 16 - etioallocholene, which melted at 143 to 145 degrees centigrade and had an $[\alpha]_D^{24}$ of plus ten degrees (0.979 percent in chloroform).

*Example 1.*—3β - acetoxy - 16(17) - oxido - 17 - (1-acetoxyethylene) - etioallocholane (3β,20 - diacetoxy-16(17)-oxido-20-allopregnene)

A solution of 1.2 grams (0.003 mole) of 3β-acetoxy - 17 - (1 - acetoxyethylene) - 16 - etioallocholene in ten milliliters of chloroform and ten milliliters of benzene was cooled in an ice and salt bath and 4.15 milliliters (0.004 mole) of a 1.93 normal benzene solution of perbenzoic acid was then added thereto. The reaction mixture was maintained at about zero degrees centigrade for sixteen hours, whereafter the solution was diluted with ether and washed with an ice-cold dilute sodium carbonate solution. The ether solution was then washed with two portions of water and then with a saturated salt solution and thereafter dried with anhydrous sodium sulfate. The solvent was then removed under reduced pressure and the residue crystallized from Skellysolve B (hexane hydrocarbons) to yield 0.95 gram of product melting at 127 to 129 degrees centigrade. Recrystallization of these crystals from the same solvent was productive of 3β-acetoxy-16(17)-oxido-17-(1-acetoxyethylene)-etioallocholane melting at 128 to 131 degrees centigrade, and having an $[\alpha]_D^{24}$ of plus thirty degrees (0.539 percent in chloroform). Infrared and ultraviolet absorption analyses confirmed the structure.

*Analysis.*—Percent calculated for $C_{25}H_{38}O_5$: C, 72.08; H, 9.71; acetyl, 20.66. Found: C, 71.96; H, 8.74; acetyl, 20.10.

The structure of the product was confirmed by conversion to the known 3β-acetoxy-16(17)-oxido-allopregnane-20-one in the following manner: To a solution of 93 milligrams (0.000224 mole) of the 3β-acetoxy-16(17)-oxido-17-(1-acetoxyethylene-etioallocholane obtained in Example 1, in five milliliters of 95 percent ethanol, was added 1.34 milliliters (0.000246 mole) of 0.184 normal aqueous ethanolic sodium hydroxide solution containing eighty percent ethanol. The reaction mixture was maintained at room temperature for four days whereafter a few drops of acetic acid was added thereto and the solvent then removed at reduced pressure. The residue was dissolved in ether and the ether solution was then washed with water, a cold dilute sodium bicarbonate solution, water, and finally with a saturated salt solution, whereafter the ether solution was dried with anhydrous sodium sulfate and the solvent then removed under reduced pressure. The residue was mixed with three milliliters of pyridine and two milliliters of acetic anhydride and the whole kept at room temperature for sixteen hours. The reaction mixture was then diluted with ether and the whole washed successively with ice water, cold dilute hydrochloric acid, water, cold dilute sodium bicarbonate solution, water, and finally with a saturated salt solution. The ether solution was dried with anhydrous sodium sulfate and the solution was then concentrated, whereafter the product was crystallized by the addition of pentane. There was thus obtained 0.035 gram of white crystalline 3β-acetoxy - 16(17) - oxido - allopregnane-20-one, melting at 188 to 189 degrees centigrade and having an $[\alpha]_D^{20}$ of plus 42 degrees (1.405 percent in chloroform).

*Example 2.*—3β - acetoxy - 16(17) - oxido - 17 - (1-acetoxyethyleneoxide) - etioallocholane (3β,20-diacetoxy -16(17),20(21) - dioxidoallopregnane)

To a solution of 0.4 gram (0.001 mole) of 3β-acetoxy - 17 - (1 - acetoxyethylene) - 16 - etioallocholene in three milliliters of benzene was added 2.4 milliliters (0.00246 mole) of a 2.06 normal benzene solution of perbenzoic acid. The reaction mixture was maintained at room temperature for five days whereafter ether and an ice cold dilute sodium bicarbonate solution were added thereto. The ether layer was washed with water and a saturated salt solution and thereafter dried with anhydrous sodium sulfate. The solvent was then removed at reduced pressure and the residue crystallized from an ether-pentane mixture to yield 0.28 gram of white crystalline 3β-acetoxy-16(17)- oxido - 17 -(1 - acetoxyethyleneoxide)-etioallocholane melting at 125 to 134 degrees centigrade. A sample recrystallized from ether melted at 136 to 138 degrees centigrade. Infrared spectrum analysis confirmed the theoretical structure.

*Analysis.*—Percent calculated for $C_{25}H_{38}O_6$: C, 69.42; H, 8.39. Found: C, 69.53; H, 8.51.

Additional illustrations of the scope of the present invention are as follows:

Following the procedure of Example 1, normal 3β - acetoxy - 16(17) - oxido - 17-(1-acetoxyethylene)-etioallocholane is prepared by reacting normal 3β- acetoxy-17-(1- acetoxyethylene)-16-etiocholene with about one molar equivalent of perbenzoic acid in benzene. Following the procedure of Example 2, normal 3β-acetoxy-16(17)-oxido - 17 -(1-acetoxyethyleneoxide)-etiocholane is prepared by reacting normal 3β-acetoxy-17-(1-acetoxyethylene)-16-etiocholene with an excess of perbenzoic acid in benzene. The starting normal 3β-acetoxy-17-(1-acetoxyethylene)-16-etiocholene is prepared by reacting normal 3β-hydroxy-16-pregnene-20-one with isopropenyl acetate in the presence of para-toluene-sulfonic acid according to the method given in Preparation 1.

Following the procedure of Example 1, 3β-propionyloxy-16(17)-oxido-17-(1-acetoxyethylene)-etioallocholane is prepared by reacting 3β-propionyloxy-17-(1-acetoxyethylene)-16-etioallocholene with about a molar equivalent of perbenzoic acid in benzene. Following the procedure of Example 2, 3β-propionyloxy-16(17)-oxido-17-(1-acetoxyethyleneoxide)-etioallocholane is prepared by reacting 3β-propionyloxy-17-(1-acetoxyethylene)-16-etioallocholene with an excess of perbenzoic acid in benzene. The starting 3β-propionyloxy-17-(1-acetoxyethylene)-16-etioallocholene is prepared by reacting 3β-propionyloxy-16-allopregnene-20-one, which in turn is prepared by reacting 3β-hydroxy-16-allopregnene-20-one with propionic anhydride in pyridine, with isopropenyl acetate in the presence of para-toluenesulfonic acid.

In the same manner, by reacting other normal and allo 3α- and 3β-acyloxy-17-(1-acyloxyethylene)-16-etiocholenes with a peracid such as, for example, perbenzoic acid, peracetic acid, and others, in a suitable solvent such as, for example, methylene chloride, benzene, toluene, chloroform, acetic acid, mixtures of these, and others, other normal and allo 3α- and 3β-acyloxy-17-(1-acyloxyethylene)-etiocholanes and 3α- and 3β-acyloxy-17-(1-acyloxyethyleneoxide)-etiocholanes are prepared wherein the acyloxy groups are identical or different and are of the formula AcO, Ac being the acyl radical of an organic carboxylic acid such as, for example, formic, acetic, propionic, butyric, hexanoic, heptanoic, octanoic, benzoic, phenylacetic, cyclopentylcarboxylic, cyclohexylcarboxylic, and others, depending upon the starting material.

Similarly, other starting 3α- and 3β-hydroxy-17-(1-acyloxyethylene)-16-etiocholenes are prepared by reacting the selected 3-acyloxy- or 3-hydroxy- allo or normal -16-pregnene-20-one with isopropenyl acetate or other isopropenyl acylate in the presence of an acid catalyst such as, for example para-toluenesulfonic acid or sulfoacetic acid. The acyloxy groups of the above-named compounds thus-produced are of the formula AcO, Ac being the acyl radical of an organic carboxylic acid such as, for example, formic, acetic, propionic, butyric, valeric, hexanoic, heptanoic, octanoic, benzoic, phenylacetic, cyclopentylcarboxylic, cyclohexylcarboxylic, and others, depending upon the starting material and acylating agent used.

It is to be understood that the invention is not to be limited to the exact compounds shown and described as obvious modifications and equivalents will be apparent to one skilled in the art and the invention is therefore to be limited only by the scope of the appended claims.

I claim:

1. A compound selected from the group consisting of 3-acyloxy-16(17)-oxido-17-(1-acyloxyethylene)-etiocholane and 3-acyloxy-16(17)-oxido-17-(1-acyloxyethyleneoxide)-etiocholane, wherein the acyloxy groups have the formula AcO, Ac being the acyl radical of a hydrocarbon carboxylic acid containing from one to eight carbon atoms, inclusive.

2. 3-acyloxy-16(17)-oxido-17-(1-acyloxyethylene)-etiocholane, wherein the acyloxy groups have the formula AcO, Ac being the acyl radical of a hydrocarbon carboxylic acid containing from one to eight carbon atoms, inclusive.

3. 3-acyloxy-16(17)-oxido-17-(1-acyloxyethyleneoxide)-etiocholane, wherein the acyloxy groups have the formula AcO, Ac being the acyl radical of a hydrocarbon carboxylic acid containing from one to eight carbon atoms, inclusive.

4. Normal 3β-acetoxy-16(17)-oxido-17-(1-acetoxyethylene)-etiocholane.

5. 3β-acetoxy-16(17)-oxido-17-(1-acetoxyethylene)-etioallocholane.

6. Normal 3β-acetoxy-16(17)-oxido-17-(1-acetoxyethyleneoxide)-etiocholane.

7. 3β-acetoxy-16(17)-oxido-17-(1-acetoxyethyleneoxide)-etioallocholane.

8. Normal 3β-propionyloxy-16(17)-oxido-17-(1-acetoxyethylene)-etiocholane.

9. A process for converting a double bond in a 3-acyloxy-17-(1-acyloxyethylene)-16-etiocholene to an oxido group which comprises: reacting a 3-acyloxy-17-(1-acyloxyethylene)-16-etiocholene wherein the acyloxy groups have the formula AcO, Ac being the acyl radical of an organic carboxylic acid, with an organic peracid at a temperature between about minus forty degrees centigrade and about forty degrees centigrade.

10. A process for the production of a 3-acyloxy-16(17)-oxido-17-(1-acyloxyethylene)-etiocholane which comprises: reacting a 3-cycloxy-17-(1-acyloxyethylene)-16-etiocholene wherein the acyloxy groups have the formula AcO, Ac being the acyl radical of an organic carboxylic acid, with about one molar equivalent of an organic peracid at a temperature between about minus forty degrees centigrade and about forty degrees centigrade to produce a 3-acyloxy-16(17)-oxido-17-(1-acyloxyethylene)-etiocholane.

11. The process of claim 10 wherein the acyloxy groups are acetoxy groups.

12. A process for the production of a 3-acyloxy-16(17)-oxido-17-(1-acyloxyethyleneoxide)-etiocholane which comprises: reacting a 3-acyloxy-17-(1-acyloxyethylene)-16-etiocholene wherein the acyloxy groups have the formula AcO, Ac being the acyl radical of an organic carboxylic acid, with at least about two molar equivalents of an organic peracid at a temperature between about minus forty degrees centigrade and about forty degrees centigrade to produce a 3-acyloxy-16(17)-oxido-17-(1-acyloxyethyleneoxide)-etiocholane.

13. The process of claim 12 wherein the acyloxy groups are acetoxy groups.

14. A process for the production of an oxide of a 3-acyloxy-17-(1-acyloxy-ethylene)-16-etiocholene which comprises: reacting a compound selected from the group consisting of 3-acyloxy-16-pregnene-20-ones and 3-hydroxy-16-pregnene-20-ones with an isopropenyl acylate in the presence of an acidic catalyst to produce a 3-acyloxy-17-(1-acyloxyethylene)-16-etiocholene, and reacting the thus-produced 3-acyloxy-17-(1-acyloxyethylene)-16-etiocholene with an organic peracid at a temperature between about minus forty degrees centigrade and about forty degrees centigrade.

15. A process for the production of a 3-acyloxy-16(17)-oxido-17-(1-acyloxyethylene)-etiocholane which comprises: reacting a compound selected from the group consisting of 3-acyloxy-16-pregnene-20-ones and 3-hydroxy-16-pregnene-20-ones with an isopropenyl acylate in the presence of an acidic catalyst to produce a 3-acyloxy-17-(1-acyloxyethylene)-16-etiocholene, and reacting the thus-produced 3-acyloxy-17-(1-acyloxyethylene)-16-etiocholene with about one molar equivalent of an organic peracid at a temperature between about minus forty degrees centigrade and about forty degrees centigrade to produce a 3-acyloxy-16(17)-oxido-17-(1-acyloxyethylene)-etiocholane.

16. The process of claim 15 wherein the acyloxy groups are acetate groups.

17. A process for the production of a 3-acyloxy-16(17)-oxido-17-(1-acyloxyethyleneoxide)-etiocholane which comprises: reacting a compound selected from the group consisting of 3-hydroxy-16-pregnene-20-ones and 3-acyloxy-16-pregnene-20-ones with an isopropenyl acylate in the presence of an acidic catalyst to produce a 3-acyloxy-17-(1-acyloxyethylene)-16-etiocholene, and reacting the thus-produced 3-acyloxy-17-(1-acyloxyethylene)-16-etiocholene with at least about two molar equivalents of an organic peracid at a temperature between about minus forty degrees centigrade and about forty degrees centigrade to produce a 3-acyloxy-16(17)-oxido-17-(1-acyloxyethyleneoxide)-etiocholane.

18. The process of claim 17 wherein the acyloxy groups are acetoxy groups.

No references cited.